(12) United States Patent
Shankar et al.

(10) Patent No.: US 12,223,355 B2
(45) Date of Patent: Feb. 11, 2025

(54) SYNCHRONIZATION OF SYSTEM RESOURCES IN A MULTI-SOCKET DATA PROCESSING SYSTEM

(71) Applicant: Xilinx, Inc., San Jose, CA (US)

(72) Inventors: Karthik Shankar, San Jose, CA (US); Jaideep Dastidar, San Jose, CA (US); Ahmad R. Ansari, San Jose, CA (US); Sagheer Ahmad, Cupertino, CA (US)

(73) Assignee: Xilinx, Inc., San Jose, CA (US)

( * ) Notice: Subject to any disclaimer, the term of this patent is extended or adjusted under 35 U.S.C. 154(b) by 520 days.

(21) Appl. No.: 17/455,074

(22) Filed: Nov. 16, 2021

(65) Prior Publication Data

US 2023/0153156 A1 May 18, 2023

(51) Int. Cl.
*G06F 9/44* (2018.01)
*G06F 9/50* (2006.01)

(52) U.S. Cl.
CPC .................................. *G06F 9/5027* (2013.01)

(58) Field of Classification Search
USPC ........................................................ 718/104
See application file for complete search history.

(56) References Cited

U.S. PATENT DOCUMENTS

| | | |
|---|---|---|
| 5,384,906 A | 1/1995 | Horst |
| 11,055,106 B1 | 7/2021 | Cochell et al. |
| 2010/0111115 A1 | 5/2010 | Tsuikj et al. |
| 2010/0174892 A1* | 7/2010 | Steeb .................. G06F 11/3632 712/E9.032 |

OTHER PUBLICATIONS https://developer.arm.com/documentation/101489/0000/Hardware-description/Chip-to-Chip-communications, 7 pages.

* cited by examiner

*Primary Examiner* — Timothy A Mudrick
(74) *Attorney, Agent, or Firm* — Kevin T. Cuenot

(57) ABSTRACT

Synchronizing system resources of a multi-socket data processing system can include providing, from a primary System-on-Chip (SOC), a trigger event to a global synchronization circuit. The primary SOC is one of a plurality of SOCS and the trigger event is provided over a first sideband channel. In response to the trigger event, the global synchronization circuit is capable of broadcasting a synchronization event to the plurality of SOCS over a second sideband channel. In response to the synchronization event, the system resource of each SOC of the plurality of SOCS is programmed with a common value. The programming synchronizes the system resources of the plurality of SOCS.

19 Claims, 10 Drawing Sheets

1100

Provide, from a primary System-on-Chip (SOC), a trigger event to a global synchronization circuit over a first sideband channel, wherein the primary SOC is one of a plurality of SOCS

1102

In response to the trigger event, broadcast, from the global synchronization circuit over a second sideband channel, an interrupt to the plurality of SOCS

1104

Program a system resource within each SOC of the plurality of SOCS with a common value to synchronize the system resources

Halt, under control of a primary System-on-Chip (SOC), each of a plurality of system resources, wherein each system resource is located in a different SOC of a plurality of SOCS of a multi-SOC system, wherein the primary SOC is one of the plurality of SOCS

1202

Write, using the primary SOC, a value to each system resource of the plurality of SOCS while halted

1204

Initiate operation, using the primary SOC, of the system resource in each SOC of the plurality of SOCS subsequent to the writing

SYNCHRONIZATION OF SYSTEM RESOURCES IN A MULTI-SOCKET DATA PROCESSING SYSTEM

TECHNICAL FIELD

This disclosure relates to multiprocessing and, more particularly, to synchronizing system resources within a multi-socket data processing system.

BACKGROUND

A symmetric multi-processing (SMP) data processing system is a data processing system having a hardware and software architecture that includes a plurality of processors (e.g., two or more processors). The processors are identical and are controlled by a single operating system instance that treats each processor equally. That is, no processor is reserved for a special purpose. The processors are connected to a single, shared main memory and have full access to all input and output devices.

A multi-socket (MS) data processing system refers to a data processing system having a plurality of interconnected processors each disposed in a different physical socket. The processors are connected by way of a coherent communication link that runs over a communication bus. An example of such a communication protocol is Cache Coherent Interconnect for Accelerators (CCIX). The coherent communication link supports shared main memory access.

In some MS and/or SMP data processing systems, each processor may be implemented as a System-on-Chip (SOC). An SOC is an integrated circuit (IC) that includes a plurality of processor cores. Each processor core may be configured to execute program code. The IC may be implemented as a single die within a package or as a multi-die IC implemented in a single package. Within an SMP data processing system, the operating system and application(s) executing therein have a unified view across all of the SOCS. The operating system further views each processor core in a unified manner as if each processor core were part of the same SOC.

One aspect of certain multi-processor data processing systems is that certain system resources must be synchronized across the SOCS. An example of a system resource that must be synchronized across SOCS in various type of systems including MS-SMP data processing systems is a system counter. As an example, the operating system of an MS-SMP data processing system may migrate a process from a first processor core in a first SOC disposed in a first socket to another processor core in a second SOC disposed in a second socket. The migrated process should see a consistent state of certain system resources before, during, and after the migration. In the case of a system counter for example, the system counter used by the first SOC should be synchronized with the system counter of the second SOC such that the value of each system counter, during operation, matches (e.g., is synchronized). This allows the migrated process to see a consistent state with respect to the system counter of the first SOC before and the system counter of the second SOC after migration.

SUMMARY

In one or more example implementations, a method of synchronizing system resources of a multi-socket data processing system can include providing, from a primary System-on-Chip (SOC), a trigger event to a global synchronization circuit. The primary SOC is one of a plurality of SOCS and the trigger event is provided over a first sideband channel. The method can include, in response to the trigger event, broadcasting, from the global synchronization circuit, a synchronization event to the plurality of SOCS over a second sideband channel. The method also can include, in response to the synchronization event, programming the system resource of each SOC of the plurality of SOCS with a common value, wherein the programming synchronizes the system resources of the plurality of SOCS.

In one or more example implementations, a method of synchronizing system resources of a multi-socket data processing system can include halting, under control of a primary SOC, each of a plurality of system resources. Each system resource is located in a different SOC of a plurality of SOCS of a multi-SOC system. The primary SOC is one of the plurality of SOCS. The method can include writing, using the primary SOC, an updated value to the system resource of each other SOC of the plurality of SOCS while halted. The method also can include initiating operation, using the primary SOC, of the system resource in each SOC of the plurality of SOCS subsequent to the writing.

In one or more example implementations, a system for synchronizing system resources of a multi-socket data processing system can include a plurality of SOCS. The plurality of SOCS are interconnected through a communication bus. Each SOC includes a plurality of processor cores. One SOC of the plurality of SOCS is designated as a primary SOC. The system can include a global synchronization circuit. The system can include a plurality of sideband channels coupling the global synchronization circuit to each of the plurality of SOCS. The primary SOC is configured to provide a trigger event over a first sideband channel of the plurality of sideband channels. The trigger event initiates synchronization of the system resources disposed in the plurality of SOCS. The global synchronization circuit is configured to broadcast a synchronization event to each of the plurality of SOCS over a second sideband channel of the plurality of sideband channels in response to receiving the trigger event.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 11 illustrates an example method of synchronizing system resources in a multi-socket (MS) data processing system that includes sideband channels and global synchronization circuitry.

FIG. 12 illustrates an example method of synchronizing system resources in an MS data processing system that does not include sideband channels or global synchronization circuitry.

DETAILED DESCRIPTION

This disclosure relates to multiprocessing and, more particularly, to synchronizing system resources within a multi-socket (MS) data processing system. The inventive arrangements also may be applied to symmetric multiprocessing (SMP) data processing systems. An MS data processing system may be implemented in which each socket includes a System-on-Chip (SOC). Each SOC may include a plurality of processor cores.

In an MS-SMP data processing system, certain resources must be synchronized across the sockets once the boot process completes to ensure proper and error free operation. Resources that are architecturally defined within the MS-SMP data processing system as one per SMP (e.g., one per SOC) require this synchronization. Examples of these resources include, but are not limited to, system counters, debug trace timestamp generators, and the like.

For purposes of illustration, the system counter associated with each socket is free running. Despite each system counter being configured to count at the same frequency, there is no guarantee that each system counter starts at the same time. If the system counters of the respective sockets have different start times, the values of the system counters will not be equal or in synchronization. With the system counter for each socket being out of synchronization, the operating system of the MS-SMP data processing system may exhibit unpredictable behavior when managing and scheduling processes on processor cores in different sockets.

Debug trace timestamps are another example of a system resources that requires synchronization. When debug trace timestamps are not synchronized, the chronology of debug and/or trace events generated and stored in the system may be incorrect. This makes establishing the true chronology of such events prohibitively difficult. Debugging activities may be hindered by the inaccurate event chronology. Synchronizing debug trace timestamps improves the debugging capabilities of the MS-SMP system by improving accuracy of the event chronology, which facilitates debugging efforts.

The inventive arrangements described within this disclosure provide methods, systems, and computer-program products capable of ensuring that certain system resources of an MS data processing system and/or MS-SMP data processing system are synchronized. Further aspects of the inventive arrangements are described below with reference to the figures.

Figure 1:
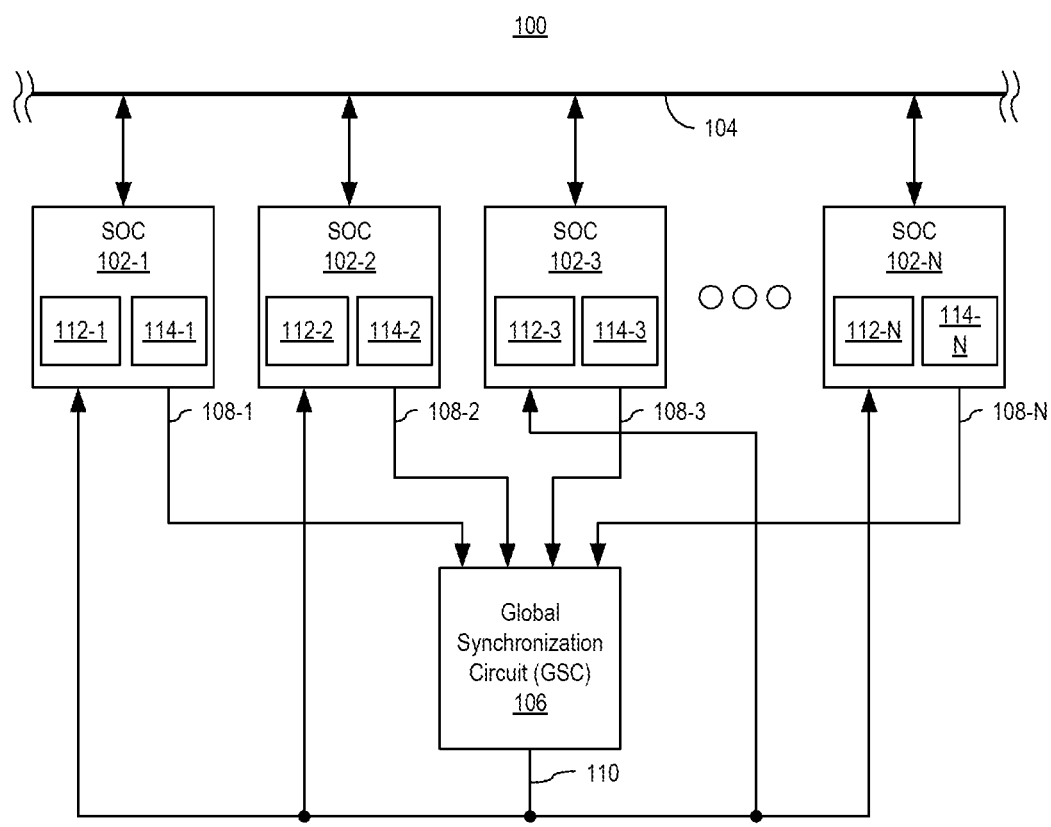
FIG. 1 illustrates an example system including a plurality of interconnected System-on-Chips (SOCS).

FIG. 1 illustrates an example system 100. System 100 is an example of an MS data processing system. Further, system 100 may be an MS-SMP data processing system. In the example of FIG. 1, system 100 includes a plurality of SOCS 102. System 100 may include fewer or more SOCS 102 than shown. In the example of FIG. 1, each SOC 102 is disposed in its own socket. In the example of FIG. 1, each SOC 102 includes a plurality of processor cores 112. The processor cores 112 may be hardwired processor cores (e.g., hardened circuits). Each processor core may be configured to execute program code. Further, each SOC 102 may be identical.

In another aspect, each SOC 102 may include one or more "soft processors" formed from programmable logic. In still another aspect, each SOC 102 may include a combination of hardwired and soft-processors. In the case where one or more SOCS 102 implement a soft-processor, those SOCS 102 that do implement soft-processor(s) should be implemented such that the soft-processor(s) have access to the synchronized system resource.

In one aspect, each of SOCS 102 may be disposed on a same circuit board or card. In another aspect, each of SOCS 102 may be disposed on a different circuit board or card. In other aspects, two or more circuit boards or cards may be used where SOCS 102 are distributed across such circuit boards/cards in varying combinations of one or more SOCS per circuit board. SOCS 102 may be used as the processors of a data processing system or may be accelerators included in a larger data processing system that includes a host processor or Central Processing Unit (CPU).

Within system 100, each socket, and as such each SOC 102, may be identified with a socket identifier (ID) that uniquely identifies socket and, as such, the SOC 102 disposed in the socket. Though the operating system of an MS-SMP data processing system may view each SOC equally, one SOC may be designated as a primary SOC. Thus, the SOC 102 disposed in the primary socket may be designated as the primary SOC. The SOC disposed in the primary socket is generally responsible for handling operations relating to configuration and booting of system 100, including the other sockets. For example, the primary SOC may perform functions such as boot, power management, error, and health management of system 100. In the example of FIG. 1, SOC 102-1 is the primary SOC 102.

SOCS 102 are coupled to a communication bus 104. In one aspect, communication bus 104 may be implemented as a Peripheral Component Interconnect Express (PCIe) bus. As discussed, a coherent communication link may run over bus 104. SOCS 102 are also communicatively linked to a global synchronization circuit (GSC) 106. In the example of FIG. 1, GSC 106 is coupled to each of SOCS 102 via one or more sideband channels. For example, each SOC 102 may be connected to GSC 106 via an outgoing sideband channel 108 (e.g., 108-1, 108-2, 108-3, and 108-N). Each SOC 102 is also coupled to GSC 106 via an incoming sideband channel 110 over which events and/or interrupts may be broadcast from GSC 106. The sideband channels are different physical signal paths than are implemented with respect to communication bus 104. That is, sideband channels may be distinct from communication bus 104.

In one or more example implementations, sideband channel 108-1 may be included while sideband channels 108-2, 108-3, and 108-N may be omitted.

In one or more example implementations, where SOCs 102 are disposed on a same circuit board, GSC 106 may be disposed on the same circuit board as SOCs 102. In another example implementation, GSC 106 may be disposed on a circuit board that is separate and distinct from the circuit boards on which SOCs 102 are disposed. In still another example implementation, where SOCs 102 are disposed on a plurality of different circuit boards, GSC 106 may be disposed on one of the circuit boards that includes one or more of the SOCs 102. GSC 106 may be coupled via the sideband channels to SOCs 102 (e.g., to sockets for the SOCs 102) via wires/traces in the circuit boards and/or by dedicated cables.

In one or more example implementations, each SOC 102 may include a particular processor core that is designated for performing the synchronization related functions described herein. In some cases, the designated processor core is referred to as the System Control Processor (SCP). An SCP typically handles boot operations, power management, error management, and health management of the system.

In other cases, the designated processor core is referred to as a System Resource Reset Processor (SRRP). It should be appreciated that in cases where the SOCS 102 are identical, the terms SCP and SRRP, to the extent such terms are used to refer to particular processor cores in the primary SOC and/or in non-primary SOCS, are used only to refer to the roles of the respective designated processor cores in the respective SOCS 102. The SCP and SRRPS may be the same processor core from an architectural perspective.

In one aspect, the SCP/SRRPS are specialized processor cores in each SOC 102 tasked with performing the operations described within this disclosure. In one or more other example implementations, the SCP/SRRPS of each SOC 102 may be the same as the other processor cores in the respective SOC 102, but designated or selected to perform the functions described herein. That is, the processor cores may be identical with the SCP/SRRP being one of the plurality of identical processor cores designated as such in the respective SOCS 102.

Each SOC 102 further includes one or more synchronized system resources (SSRS) 114. Within this disclosure, system counters are used as example SSRS 114. A system counter is a circuit that monotonically increases and does not rollover during the life of the boot session of the system. Processor cores of an SOC 102 may subscribe to the system counter for that SOC and use the system counter to generate timer events on a per processor core basis, which may be used by the operating system and/or applications to obtain a notion of time, for scheduling, and the like.

Other examples of SSRS 114 may include debug trace timestamp generators. It should be appreciated, however, that SSRS 114 are not intended to be limited to the examples described. In general, SMP resources that are architecturally defined as one per SMP, e.g., one per SOC 102, may require synchronization and may be considered SSRS 114.

Figure 2:
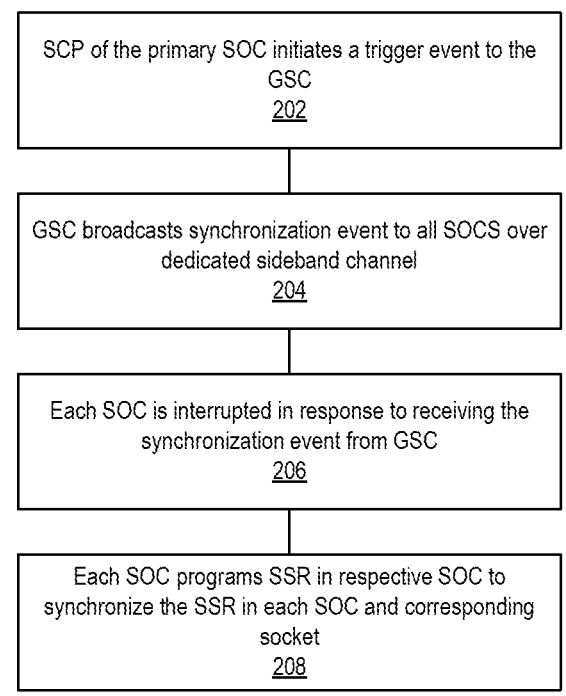
FIG. 2 illustrates an example method depicting certain operative features of the system of FIG. 1.
Figure 3:
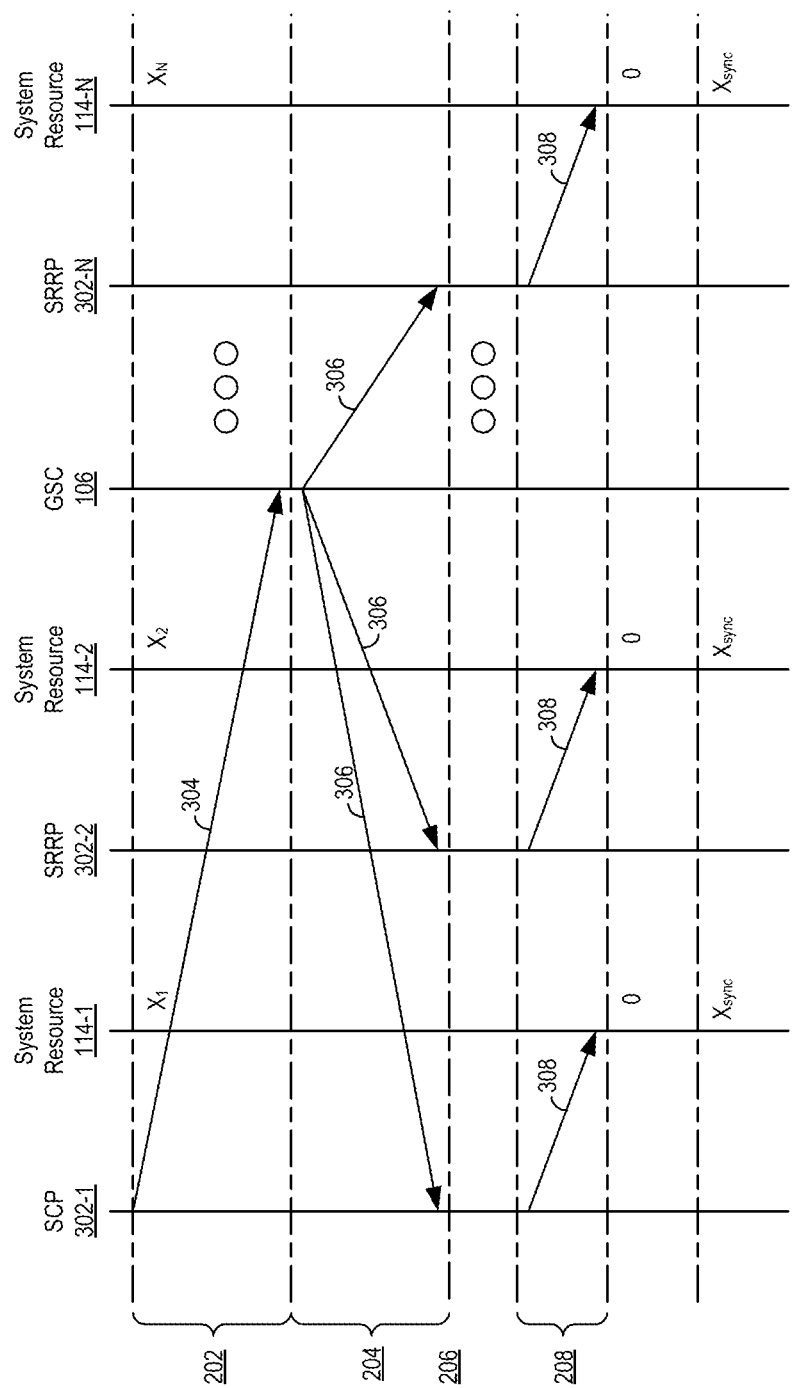
FIG. 3 is a signal flow diagram illustrating example communications among SOCS.

FIG. 2 illustrates an example method 200 depicting certain operative features of system 100 of FIG. 1. For purposes of illustration, SOC 102-1 is designated as the "primary" SOC in system 100. FIG. 3 is a signal flow diagram illustrating example communications among SOCS 102 of system 100 of FIG. 1. FIGS. 2-3 illustrate example operations for synchronizing SSRS 114 within system 100 and may be performed as part of a boot process of system 100. For purposes of illustration, SSRS 114 are considered to be system counters. Initially, as noted, SSRS 114 are free running and have different values as SSRS 114 as the system resources did not have synchronized start times. Rather, one or more or all of the SSRS 114 may have started operating at different times. The different values of SSRS 114 are reflected in the values stored in each shown as $X_1$ for SSRS 114-1, $X_2$ for SSRS 114-2, and $X_N$ for SSRS 114-N.

Referring to FIGS. 2-3, in block 202, SCP 302-1, the SCP of the primary SOC 102-1, provides a trigger event 304 to GSC 106. In one aspect, trigger event 304 may be a pulse. In the example, SCP 302-1 is configured to provide trigger event 304 over a first sideband channel 108-1 to GSC 106. In one or more example implementations, only SCP 302-1, e.g., the SCP of the primary SOC, is configured to generate trigger event 304 and forward the trigger event to GSC 106 via a sideband channel.

In block 204, in response to trigger event 304, GSC 106 is capable of broadcasting a synchronization event 306 over sideband channel 110 to each of the plurality of SOCS 102. In one aspect, synchronization event 306 is an interrupt. Each SOC 102, in response to synchronization event 306, is capable of initiating an interrupt service routine. In block 206, SCP 302-1, SRRP 302-2, 302-N in each SOC 102 is interrupted in response to receiving synchronization event 306. An "interrupt service routine," also referred to as an interrupt handler, is a software process invoked by an interrupt request that may be generated from a hardware device, a software interrupt instruction, or a software exception. The interrupt service routine handles the request and sends the request to a particular program or portion of code that, in executing, interrupts the active process executed by the processor/processor core prior to the occurrence of the interrupt. When the interrupt service routine is complete, the interrupted process is resumed.

In block 208, a designated processor core in each SOC 102 programs 308 the respective SSR 114 located in the same SOC. The designated processor core may be SCP 302-1 in the primary SOC 102-1 and SRRP 302-2, 302-N in the non-primary SOCS 102-2, 102-N. The SSR 114 of each SOC 102 is synchronized in consequence of the programming. For example, the programming may write the same configuration data or value to each SSR 114. In the example, in response to receiving synchronization event 306, SCP 302-1, SRRP 302-2, 302-N is capable of executing an interrupt service routine that causes the respective processor core to program the respective SSR 114 located in the same SOC. Since each SOC 102 receives the synchronization event 306 broadcast over the sideband channel, each receives the synchronization event 306 at the same time. Referring to FIG. 3, each designated processor core (e.g., SCP 302-1, SRRP 302-2, 302-N) writes a value of 0 to the corresponding SSR 114 at the same time. In consequence, SSRS 114 are synchronized. As illustrated in FIG. 3, each SSRS 114 continues to operate from the initialized value, e.g., 0 in this case, and has a same value of at the $X_{sync}$ thereafter.

Figure 4:
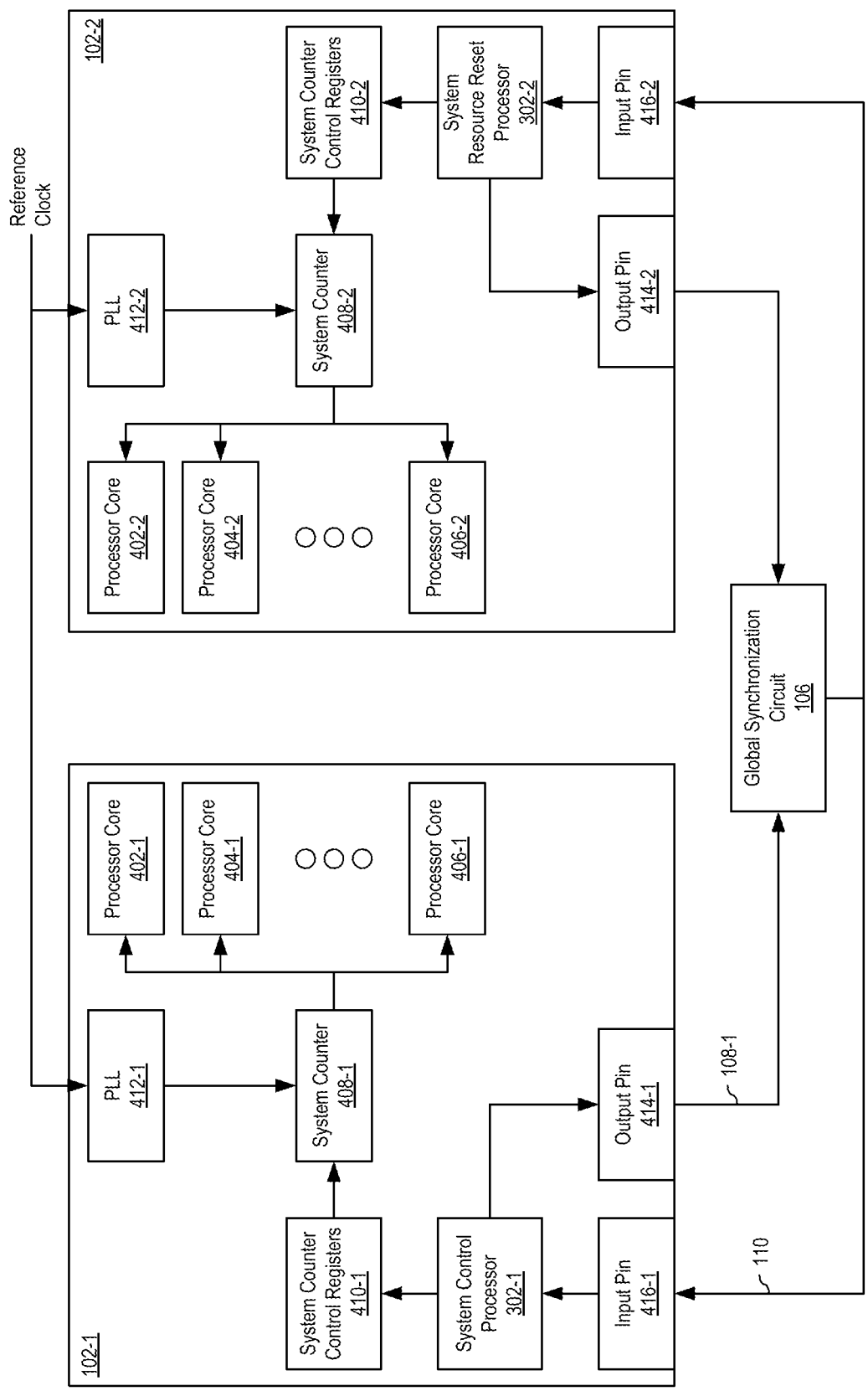
FIG. 4 illustrates another example implementation of the system of FIG. 1.

FIG. 4 illustrates another example implementation of system 100. In the example of FIG. 4, for ease of description and clarity, only SOCS 102-1 and 102-2 are shown. In the example, each SOC 102 includes a plurality of processor cores 402, 404, 406, and 302, a system counter 408 (e.g., an SSR 114), system counter control registers 410, a phase locked loop (PLL) 412, an output pin 414, and an input pin 416.

In the example of FIG. 4, SCP 302-1 is capable of generating trigger event 304 that is conveyed out of output pin 414-1 to GSC 106 via sideband channel 108-1. In the example, SRRP 302-2 may be coupled to output pin 414-2. SRRP 302-2, however, not being part of primary SOC 102-1, does not generate or send trigger events.

In response to receiving trigger event 304, GSC 106 broadcasts synchronization event 306 over sideband channel 110. Each SOC 102 receives synchronization event 306, e.g., the interrupt, via the corresponding input pin 416. Synchronization event 306 is provided to the designated processor core in each SOC 102. The designated processor core of the primary SOC 102 is SCP 302-1, while the designated processor core in each non-primary SOLS 102 is SRRP 302-2.

SCP 302-1, in response to receiving synchronization event 306, executes an interrupt service routine that causes SCP 302-1 to write configuration data to system control registers 410-1 to reset system counter 408-1. SRRP 302-2, in response to receiving synchronization event 306, executes the interrupt service routine that causes SRRP 302-2 to write configuration data to system control registers 410-2 to reset system counter 408-2. Because synchronization event 306 is broadcast to each SOC 102, each SOC 102 receives synchronization event 306 at the same time. As such, resetting of system counters 408 is performed in synchronization.

Though system counters 408 are free running, each runs off of a common reference clock that flows through PLL 412. Once synchronized, each system counter 408 is capable of counting in a synchronized manner with each other system counter 408 as each is driven by a respective PLL 412 that receives a common reference clock. System counters 408 continue to operate in synchronization with one another once synchronized. Accordingly, once synchronized, processor cores 402, 404, and 406 (and SCP 302-1 and SRRP 302-2) in each SOC 102 each see a same value whether in system counter 408-1 or 408-2 at any given time. That is, system counter 408-1 is synchronized with system counter 408-2.

As noted, counters 408 may be monotonically increasing counters that do not "roll over" during the life of the boot session of system 100. Processor cores of each SOC 102 subscribe to the system counter located in the same SOC in order to generate timer events (e.g., on a per processor core basis) that may be used by the operating system and/or applications to determine or obtain a notion of time and for scheduling.

Figure 5:
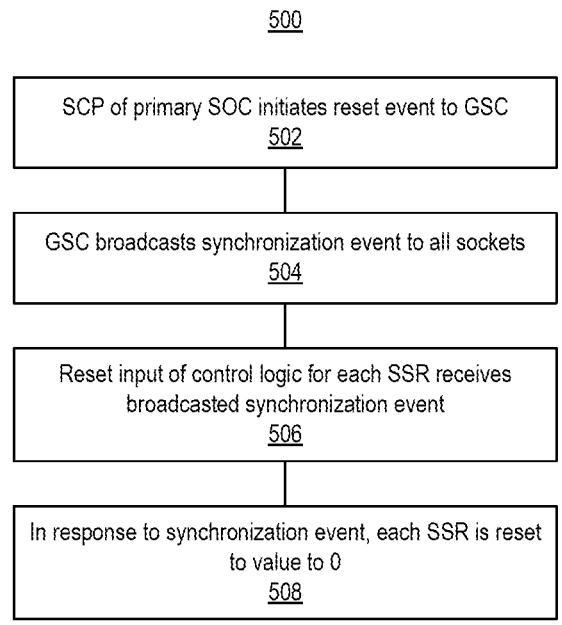
FIG. 5 illustrates an example method depicting certain operative features of the system of FIG. 1.
Figure 6:
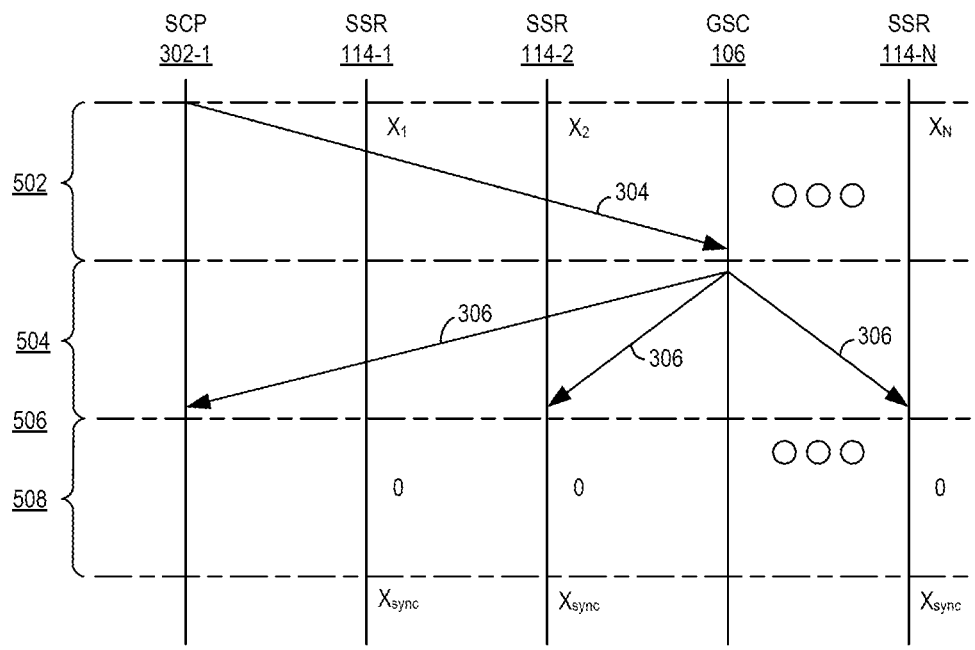
FIG. 6 is another signal flow diagram illustrating example communications among SOCS.
Figure 7:
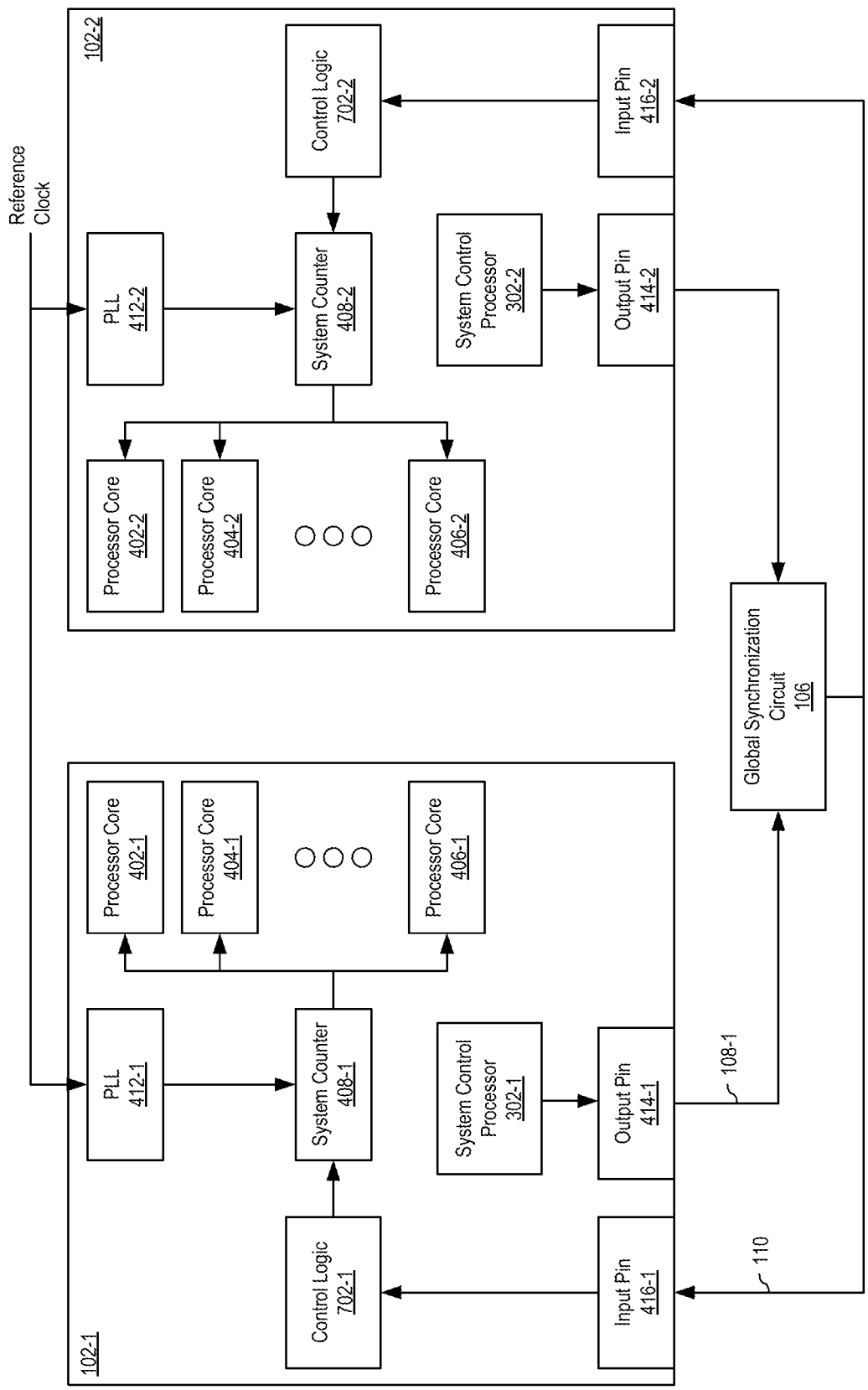
FIG. 7 illustrates another example implementation of the system of FIG. 1.

FIGS. 5-7 describe an alternative implementation for synchronizing SSRS 114 that utilizes dedicated sideband channels while avoiding the need for a dedicated SRRP as illustrated in FIGS. 2-4.

FIG. 5 illustrates an example method 500 depicting certain operative features of system 100 of FIG. 1. For purposes of illustration, SOC 102-1 is designated as the "primary" SOC in system 100. FIG. 6 is a signal flow diagram illustrating example communications among SOCS 102 of system 100 of FIG. 1. FIGS. 5-6 illustrate example operations for synchronizing SSRS 114 within system 100 and may be performed as part of a boot process of system 100. For purposes of illustration, SSRS 114 are considered to be system counters. Initially, as noted, SSRS 114 are free running and have different values as SSRS 114 did not have synchronized start times. The different values of SSRS 114 are reflected in the values stored in each shown as $X_1$ for SSRS 114-1, $X_2$ for SSRS 114-2, and $X_N$ for SSRS 114-N.

Referring to FIGS. 5-6, in block 502, SCP 302-1, the SCP of the primary SOC 102-1, provides a trigger event 304 to GSC 106. In one aspect, trigger event 304 may be a pulse. In the example, SCP 302-1 is configured to provide trigger event 304 over a first sideband channel 108-1 to GSC 106. In one or more example implementations, only SCP 302-1, e.g., the SCP of the primary SOC, is configured to generate trigger event 304 and forward the trigger event to GSC 106.

In block 504, in response to trigger event 304, GSC 106 is capable of broadcasting synchronization event 306 over sideband channel 110 to each of the plurality of SOCS 102. In one aspect, synchronization event 306 may be a pulse. In the examples of FIGS. 3-7, synchronization event 306 does not trigger execution of an interrupt service routine. Rather, in the examples of FIGS. 3-7, synchronization event 306 is provided directly to the control logic (e.g., the control logic for the respective SSR 114 in each SOC 102). In block 506, the control logic in each SOC 102 receives synchronization event 306. In block 508, in response to receiving synchronization event 306, the control logic in each SOC 102 resets the SSR 114 therein.

In consequence of block 508, the SSR 114 of each SOC 102 is synchronized as a result of the programming. For example, the programming may write the same configuration data or value to each SSR 114. Since each SOC 102 receives synchronization event 306 broadcast over the sideband channel, each receives synchronization event 306 at the same time. In the example, in response to receiving synchronization event 306, the control logic of each SOC 102 resets the SSR 114 therein to 0 at the same time as illustrated in FIG. 6 with the "0" value in the row corresponding to block 506. In consequence, SSRS 114 are synchronized. As illustrated in FIG. 6, each of SSRS 114 continues to operate from the initialized value, e.g., 0 in this case, and has a same value of at the $X_{sync}$ thereafter.

FIG. 7 illustrates another example implementation of system 100 of FIG. 1. In the example of FIG. 7, for ease of description and clarity, only SOCS 102-1 and 102-2 are shown. In the example, each SOC 102 includes a plurality of processor cores 402, 404, 406, and 302, a system counter 408 (e.g., an SSR 114), control logic 702, a Phase Locked Loop (PLL) 412, an output pin 414, and an input pin 416.

In the example of FIG. 7, SCP 302-1 is capable of generating trigger event 304 that is conveyed out of output pin 414-1 to GSC 106 via sideband channel 108-1. In the example, SCP 302-2 may be coupled to output pin 414-2. SCP 302-2, however, not being part of the primary SOC 102-1, does not generate or send trigger events.

In response to receiving trigger event 304, GSC 106 broadcasts synchronization event 306 over sideband channel 110. Each SOC 102 receives synchronization event 306 via the corresponding input pin 416. Synchronization event 306 is provided directly to control logic 702 in each respective SOC 102. Control logic 702 in each SOC 102, in response to receiving synchronization event 306, resets the corresponding system counter 408 to 0. Since counter control logic 702 in each SOC 102 receives synchronization event 306 at the same time, resetting of system counters 408 is performed in synchronization.

Though system counters 408 are free running, each runs off of a common reference clock that flows through PLL 412. Once synchronized, each system counter 408 is capable of counting in a synchronized manner with each other system counter 408 as each is driven by a PLL 412 that receives a common reference clock. System counters 408 continue to operate in synchronization with one another once synchronized. Accordingly, once synchronized, processor cores 402, 404, and 406 (and SCP 302-1 and SCP 302-2) in each SOC 102 each see a same value whether in system counter 408-1 or 408-2 at any given time. That is, system counter 408-1 is synchronized with system counter 408-2.

In the example of FIG. 7, counters 408 may be monotonically increasing counters that do not "roll over" during the life of the boot session of system 100. Processor cores of each SOC 102 subscribe to the system counter located in the same SOC in order to generate timer events (e.g., on a per processor core basis) that may be used by the operating system and/or applications to determine or obtain a notion of time and for scheduling.

Figure 8:
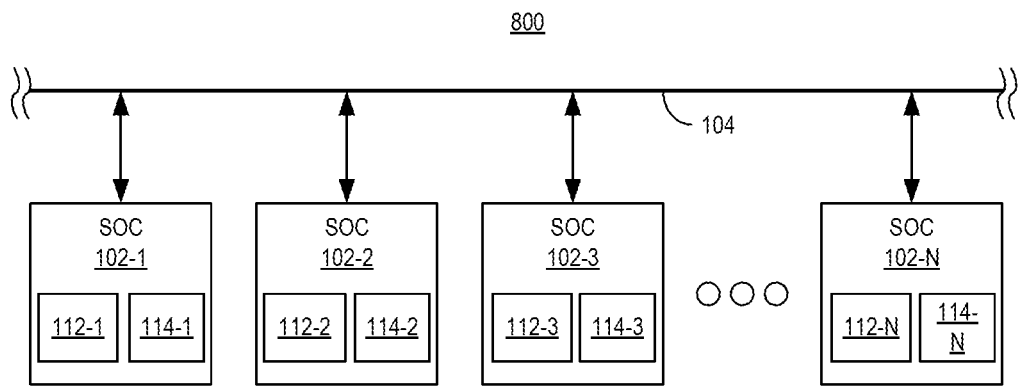
FIG. 8 illustrates another example system including a plurality of SOCS.
Figure 9:
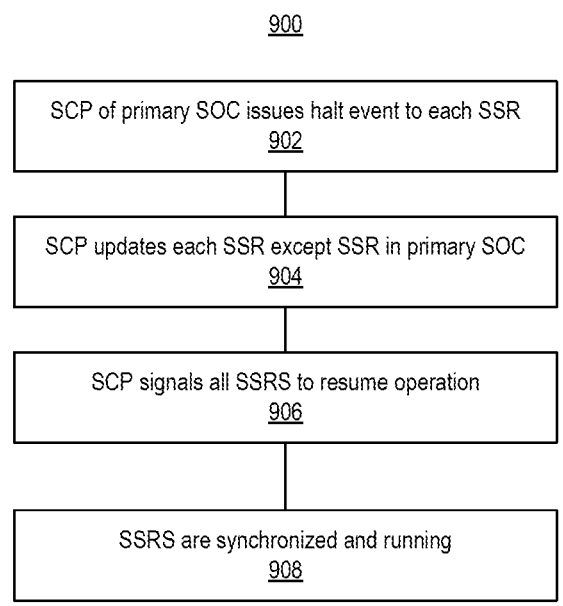
FIG. 9 illustrates an example method depicting certain operative features of the system of FIG. 8.
Figure 10:
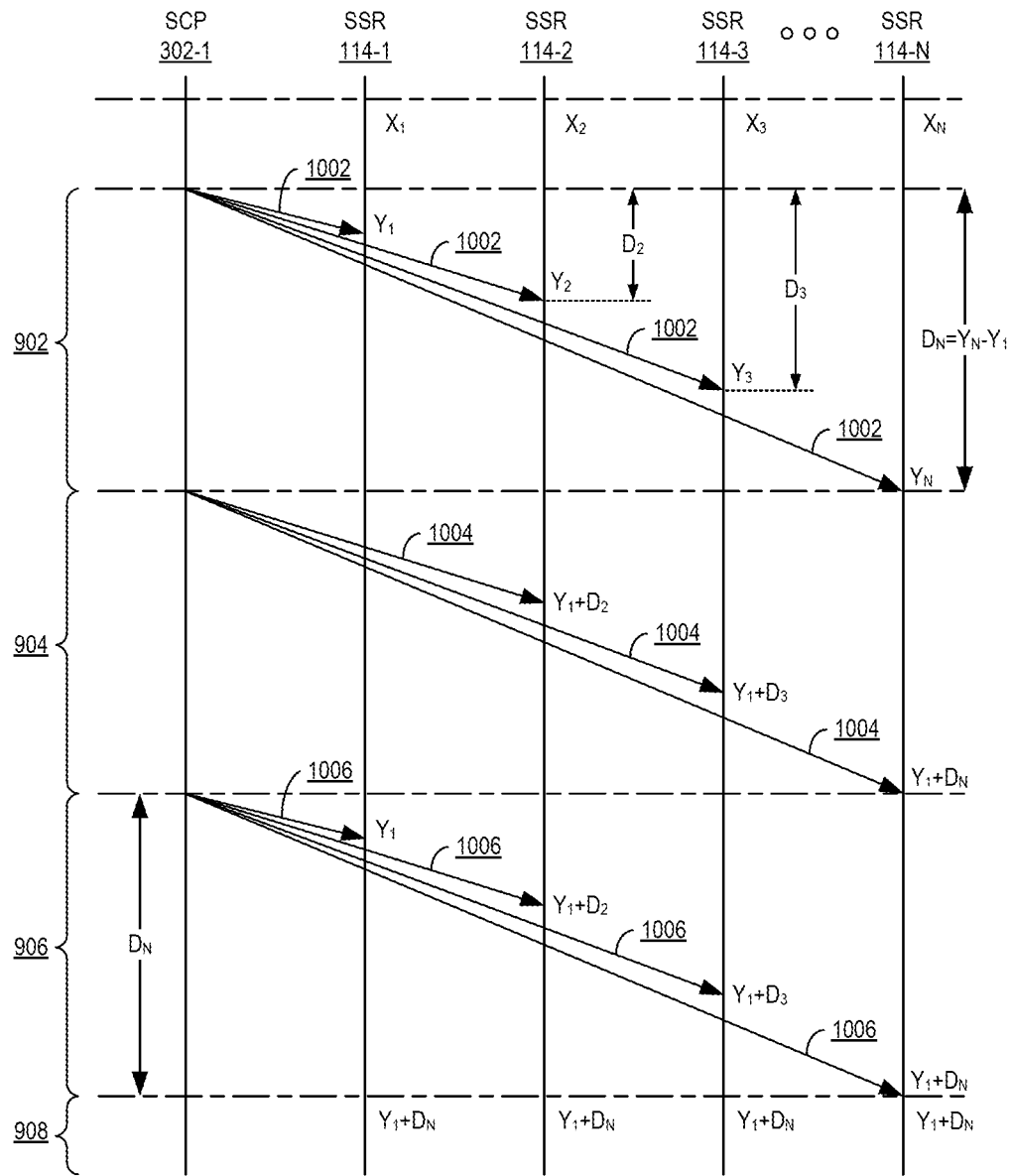
FIG. 10 is a signal flow diagram illustrating example communications among SOCS of the system of FIG. 8.

FIGS. 8-10 describe another alternative implementation for synchronizing SSRS 114 that utilizes virtualized synchronization without dedicated sideband channels. In the examples of FIGS. 8-10, rather than using a sideband channels, system software is used to perform the synchronization as a part of a boot process of an MS-SMP data processing system. Because dedicated sideband channels are not used, the example implementations of FIGS. 8-10 do not require specialized hardware or hardware updates to an existing system to be employed. The lack of sideband channels, however, leads to inter-socket communication latencies that are larger than the examples that utilize dedicated sideband channels.

FIG. 8 illustrates an example system 800. System 800 may be implemented substantially as described in connection with FIG. 1. In the example of FIG. 8, system 800 does not include any sideband channels or GSC 106. Each SOC 102 may be considered to have a multi-processor core architecture. For purposes of illustration, each SOC 102 may have an architecture as illustrated in the example of FIG. 7, though the particular architecture implemented in each SOC 102 is not intended to be limiting.

In the examples of FIGS. 8-10, the SCP of the primary SOC 102 accesses the necessary resources in each individual socket of the MS-SMP data processing system. For the SCP of the primary SOC 102 to be able to access the system counter control registers and/or control logic for each socket of the MS-SMP data processing system, the system address map of the MS-SMP data processing system must expose the control and status registers of the MS-SMP data processing system to the SCP of the primary SOC 102. The system address map is a data structure that specifies the address ranges of various memory mapped targets, e.g., components, circuit blocks, peripherals, etc., in the system. Further, during the boot sequence, the synchronization operation relies on certain hardware components being brought out of a reset state to allow the SCP of the primary SOC 102 to access such hardware components.

FIG. 9 illustrates an example method 900 depicting certain operative features of system 800 of FIG. 8, e.g., an MP-SMP data processing system that does not include sideband channels or a GSC. For purposes of illustration, SOC 102-1 is designated as the "primary" SOC in system 800. FIG. 10 is a signal flow diagram illustrating example communications among SOCS 102 of system 800 of FIG. 8. FIGS. 9-10 illustrate example operations for synchronizing SSRS 114 within system 800 and may be performed as part of a boot process of system 800. For purposes of illustration, SSRS 114 are considered to be system counters. Initially, as noted, SSRS 114 are free running and have different values as SSRS 114 did not have synchronized start times. The different values of SSRS 114 are reflected in the values stored in each shown as $Y_1$ for SSRS 114-1, $Y_2$ for SSRS 114-2, $Y_3$ for SSRS 114-3, and $Y_N$ for SSRS 114-N. In the examples of FIGS. 8-10, the events and/or signals conveyed are conveyed over bus 104.

Referring to FIGS. 9-10, in block 902, the SCP of the primary SOC 102 (e.g., SCP 302-1) issues a halt event to each SSR 114. In the example of FIG. 10, SCP 302-1 issues a halt event 1002 to the SSR 114 in the same SOC, e.g., SSR 114-1, and to the SSR 114 in each other SOC 102. As part of block 902, the SCP further reads the value of each SSR 114 once halted. In general, the values of the respective SSRS 114 may be determined with reference to SSR 114-1 in that each other SSR will have a value that is some amount of delay (D) after the value of SSR 114-1. SCP 302-1 is capable of determining the delay for each SSR 114 in reference to SSR 114-1.

In block 904, the SCP of the primary SOC 102 updates the SSR in each other SOC 102. The SCP does not update the SSR in the same SOC. Referring to FIG. 10, SCP 302-1 leaves SSR 114-1 with the same value as initially read in block 902. SCP 302-1 updates the value in each other SSR 114-2, 114-3, 114-N by writing 1004 the value of SSR 114-1 plus the respective delay for the particular SSR 114 being updated. FIG. 10 illustrates the updated values written to each of SSRS 114-2, 114-3, and 114-N by SCP 302-1 during block 904.

In block 906, the SCP of the primary SOC 102 sends an event signaling each of SSRS 114 to resume operation. In the example of FIG. 10, SCP 302-1 sends event 1006 to each SSR to resume operation. In signaling each SSR 114 to resume operation, the signal provided from SCP 302-1 to each respective SSR will incur the same delay as measured in block 902. FIG. 10 illustrates that in block 908, each SSR 114 is synchronized and free running. Each SSR 114, as discussed, may be clocked using a common reference clock to remain synchronized with the other SSRS 114.

In one or more example implementations, events such as halts, updates, and the like, as described herein and/or in connection with FIG. 9, may be implemented as register writes, e.g., to a control register, associated with the resource being synchronized and conveyed over bus 104. Register writes directed to the synchronized resources of the various sockets may be performed back-to-back in quick succession. In other example implementations, a dedicated broadcast functionality to convey an event to multiple sockets may be included such that individual writes to the synchronized resource in the various sockets need not be performed. Whether back-to-back writes or broadcast functionality is performed, delays in communicating with other sockets may be accounted for using the example techniques described herein.

Table 1 illustrates example states of the SSRS 114, e.g., the system counters, at various points in time described in FIGS. 9-10.

TABLE 1

| Event | Socket 1 (SOC 102-1) System Counter | Socket 2 (SOC 102-2) System Counter | Socket 3 (SOC 102-3) System Counter | ... | Socket N (SOC 102-N) System Counter |
|---|---|---|---|---|---|
| Out of Reset & Free Running | $X_1$ | $X_2$ | $X_3$ | ... | $X_N$ |
| SCP Issues Halt command to all system counters | $Y_1$ | $Y_2$ | $y_3$ | ... | $Y_N$ |

In the example of Table 1, socket 1 corresponds to SOC 102-1, e.g., the primary SOC. Initially, each system counter may be out of reset (e.g., corresponding to a boot process) and free running. Operation of the system counter is not synchronized as each has a different value. The SCP of the primary SOC issues the halt event. Once the system counters have halted, the SCP reads the value of each system counter and computes the difference between the values of the respective system counters and the value of the system counter in the primary socket. For a given counter in socket "N," this difference is $D_N$, where $D_N = Y_1 - Y_N$. The value $D_N$ also indicates the delay between halting the system counter of socket "N" and halting the system counter of socket 1.

The delay can be approximated as the latency incurred by the SCP in the primary socket to access the control registers and/or control logic of a particular SSR in a particular socket, e.g., a system counter in this case. Therefore, each system counter value can be re-written by the SCP such that the updated counter values compensate for this latency when the SCP unhalts each system counter. The SCP can re-write the system counter of socket "N" to $Y_1+D_N$. This ensures that when the SCP unhalts the system counters, the delay incurred in resuming the system counters will be negated by the adjustment made in the updated system counter values using the delay $D_N$.

Table 2 illustrates example states of the SSRS 114, e.g., the system counters, as the SCP of the primary socket overwrites the values of the system counters and issues the resume event (e.g., event 1006).

TABLE 2

| Event | Socket 1 (SOC 102-1) System Counter | Socket 2 (SOC 102-2) System Counter | Socket 3 (SOC 102-3) System Counter | ... | Socket N (SOC 102-N) System Counter |
|---|---|---|---|---|---|
| SCP re-programs system counters with updated values | $Y_1$ | $Y_1 + D_2$ | $Y_1 + D_3$ | ... | $Y_1 + D_N$ |
| SCP configures system counters to resume | $Y_1$ | Yet to resume | Yet to resume | ... | Yet to resume |
| After time D2, Socket 2 system counter resumes | $Y_1 + D_2$ | $Y_1 + D_2$ | Yet to resume | | Yet to resume |
| After time D3, Socket 3 system counter resumes | $Y_1+D_3$ | $Y_1 + D_3$ | $Y_1 + D_3$ | ... | Yet to resume |
| Eventually, after time DN, Socket N system counter is made to resume. All counters are synchronized | $Y_1 + D_N$ | $Y_1 + D_N$ | $Y_1 + D_N$ | ... | $Y_1 + D_N$ |

Though the example implementations described within this disclosure are described in the context of MS-SMP data processing systems, it should be appreciated that the various synchronization mechanisms and techniques described herein may be extended to synchronize system resources of other data processing systems having multiple sockets that are not SMP data processing systems.

FIG. 11 illustrates an example method 1100 of synchronizing system resources in an MS data processing system (system). The system may be an SMP data processing system.

In block 1102, a primary SOC of the system is capable of providing a trigger event to a GSC 106. The primary SOC is one of a plurality of SOCS and the trigger event is provided over a first sideband channel 108-1. In block 1104, in response to the trigger event, the GSC 106 is capable of broadcasting a synchronization event to the plurality of SOCS over a second sideband channel 110. In block 1106, in response to the synchronization event, the system resource in each SOC of the plurality of SOCS of the system is programmed with a common value. The programming synchronizes the system resources of the plurality of SOCS.

The foregoing and other implementations can each optionally include one or more of the following features, alone or in combination. Some example implementations include all the following features in combination.

In one aspect, the operations described, e.g., the providing, the broadcasting, and the programming, are performed as part of a boot process for an MS data processing system including the plurality of SOCS. The operations may be performed in response to the system resources (e.g., SSRS 114) coming out of a reset state.

In another aspect, the plurality of SOCS are identical.

In another aspect, each SOC of the plurality of SOCS includes a plurality of processor cores. A selected processor core of the plurality of processor cores of a selected SOC of the plurality of SOCS provides the trigger event. For example, an SCP as described herein may provide the trigger event.

In another aspect, each SOC of the plurality of SOCS includes a plurality of processor cores. The synchronization event may be an interrupt. A selected processor core of each SOC of the plurality of SOCS executes an interrupt service routine in response to the interrupt to program the system resource located in the same SOC. The selected processor may be the SCP in the primary SOC and a SRRP in the non-primary SOCS.

In another aspect, the selected processor core within each SOC of the plurality of SOCS, in executing the interrupt service routine, writes to a control register and/or control logic of the system resource within the same SOC.

In another aspect, within each SOC of the plurality of SOCS, the synchronization event is received by control logic of the system resource. In response to the synchronization event, the control logic of the system resource in each respective SOC resets the system resource within the same SOC.

FIG. 12 illustrates an example method 1200 of synchronizing system resources in an MS data processing system (system). The system may be an SMP data processing system. In the example of FIG. 12, the system does not include sideband channels and does not include a GSC 106.

In block 1202, the primary SOC is capable of halting each of a plurality of system resources in the system. Each system resource is located in a different SOC of a plurality of SOCS of a multi-SOC system. The primary SOC is one of the plurality of SOCS. In block 1204, the primary SOC is capable of writing an updated value to the system resource of each other SOC of the plurality of SOCS while halted. In block 1206, the primary SOC is capable of initiating (unhalting) operation of the system resource in each SOC of the of the plurality of SOCS subsequent to the writing.

The foregoing and other implementations can each optionally include one or more of the following features, alone or in combination. Some example implementations include all the following features in combination.

In one aspect, subsequent to the halting and prior to the writing, the primary SOC, e.g., the SCP of the primary SOC, is capable of reading a value from each of the plurality of system resources. For each SOC of the plurality of SOCS other than the primary SOC, the SCP is capable of determining a difference between a value read from the system resource of the primary SOC and the value read from the system resource of the other SOC. The writing includes the primary SOC, e.g., the SCP of the primary SOC, writing the updated value to each of the other SOCS. The updated value written to each of the other SOCS depends on the difference between the value read from the system resource of the primary SOC and the value read from the system resource of the other SOC.

In another aspect, the writing the updated value to each system resource of the other SOCS and the initiating operation accounts for latency in the primary SOC communicating with the respective ones of the plurality of system resources in the respective other SOCS.

In another aspect, the plurality of SOCS are identical.

In another aspect, the halting, writing, and initiating are conveyed as part of a boot process. The operations may be performed in response to the system resources (e.g., SSRS 114) coming out of a reset state.

In another aspect, communication between the primary SOC and the other SOCS is conveyed over a communication bus communicatively linking the plurality of SOCS.

Figure 13:
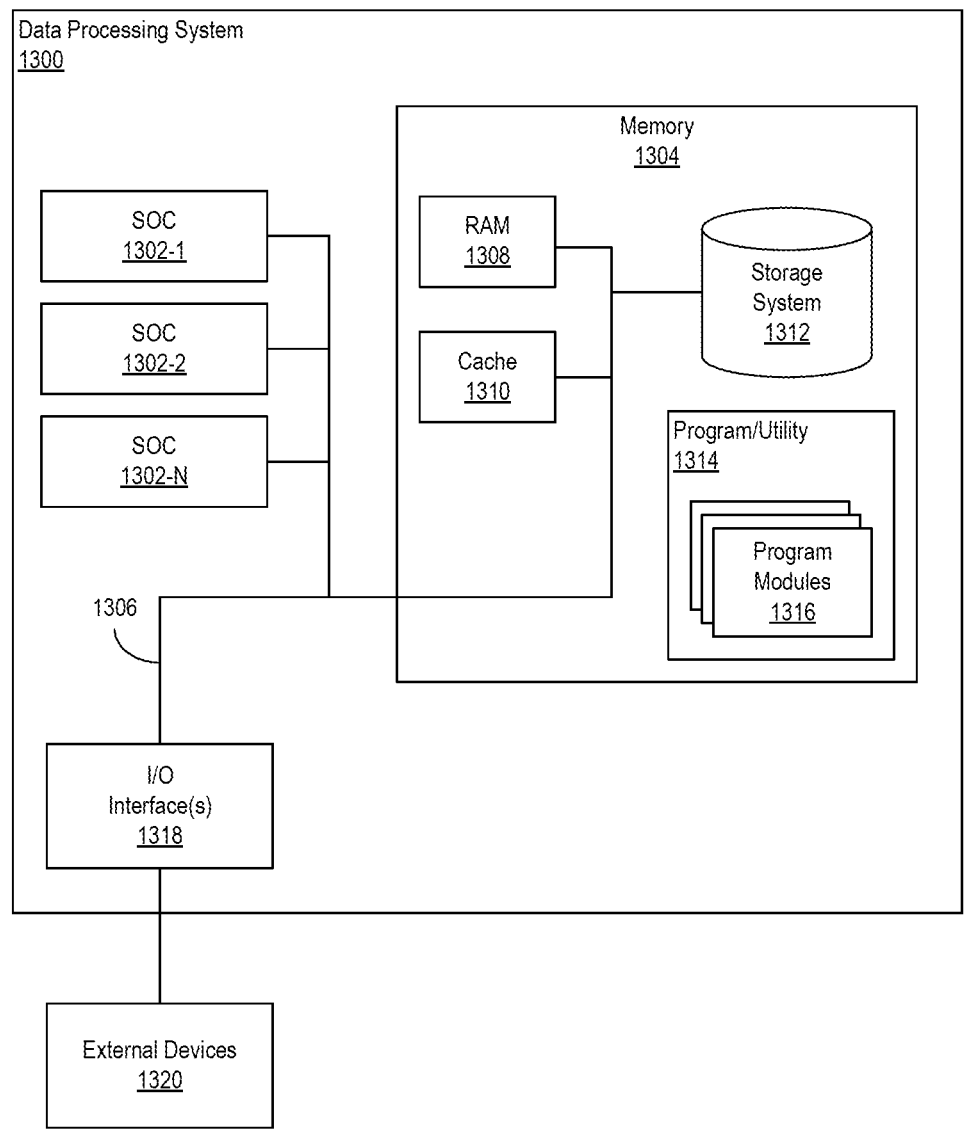
FIG. 13 illustrates an example of a multi-socket data processing system.

FIG. 13 illustrates an example implementation of an MS data processing system 1300. Data processing system 1300 further may be an SMP type of system. The components of data processing system 1300 can include, but are not limited to, a plurality of SOCS 1302, a memory 1304, and a bus 1306 that couples various system components including memory 1304 to SOCS 1302. SOCS 1302 may include processor cores having any of a variety of different architectures including, but not limited to, x86 type of architecture (IA-32, IA-64, etc.), a Power Architecture, ARM processors, and the like. As noted, in some cases, SOCS 1302 may include programmable logic that may be used to implement one or more of the plurality of processor cores of the SOCS.

As discussed, in some cases, MS data processing system may include a central processing unit (CPU) and include the plurality of SOCS 1302 as accelerators. The accelerators may be disposed on one or more different circuit boards, cards, chassis structures, or implemented in other available form factors that communicatively link with data processing system 1300, for example, via a communication bus such as bus 1306. In one or more example implementations, the accelerators may be implemented in accordance with any of the various standards and/or specifications set forth as part of the Open Compute Project (OCP) and/or OCP Accelerator Module (OAM) specifications. Further, it should be appreciated that any such accelerators may include any of a variety of different connectors and/or combinations of connectors for coupling to different systems and/or devices using one or more different communications protocols.

Bus 1306 represents one or more of any of a variety of communication bus structures. By way of example, and not limitation, bus 1306 may be implemented as a Peripheral Component Interconnect Express (PCIe) bus. Other communication busses may be used in lieu of or in addition to PCIe. Data processing system 1300 typically includes a variety of computer system readable media. Such media may include computer-readable volatile and non-volatile media and computer-readable removable and non-removable media.

Memory 1304 can include computer-readable media in the form of volatile memory, such as random-access memory (RAM) 1308 and/or cache memory 1310. Data processing system 1300 also can include other removable/non-removable, volatile/non-volatile computer storage media. By way of example, storage system 1312 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1306 by one or more data media interfaces. Memory 1304 is an example of at least one computer program product.

Program/utility 1314, having a set (at least one) of program modules 1316, may be stored in memory 1304. Program/utility 1314 is executable by processor cores of SOCS 1302. By way of example, program modules 1316 may represent an operating system, one or more application programs, other program modules, and program data. Program modules 1316, upon execution, cause data processing system 1300, e.g., one or more CPUs (not shown) and/or SOCS 1302, to carry out the functions and/or methodologies of the example implementations described within this disclosure. Program/utility 1314 and any data items used, generated, and/or operated upon by data processing system 1300 are functional data structures that impart functionality when employed by data processing system 1300.

For example, in one or more example implementations, SOCS 1302 may be implemented as described in connection with FIG. 1 and include a GSC (not shown). In one or more other example implementations, SOCS 1302 may be implemented as described in connection with FIG. 8.

Data processing system 1300 may include one or more Input/Output (I/O) interfaces 1318 communicatively linked to bus 1306. I/O interface(s) 1318 allow data processing system 1300 to communicate with one or more external devices 1320 and/or communicate over one or more networks such as a local area network (LAN), a wide area network (WAN), and/or a public network (e.g., the Internet). Examples of I/O interfaces 1318 may include, but are not limited to, network cards, modems, network adapters, hardware controllers, etc. Examples of external devices also may include devices that allow a user to interact with data processing system 1300 (e.g., a display, a keyboard, and/or a pointing device) and/or other devices such as accelerator card.

Data processing system 1300 is only one example implementation. Data processing system 1300 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices. The example of FIG. 13 is not intended to suggest any limitation as to the scope of use or functionality of example implementations described herein. A data processing system is an example of computer hardware that is capable of performing the various operations described within this disclosure.

Data processing system 1300 may include fewer components than shown or additional components not illustrated in FIG. 13 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Data processing system 1300 may be operational with numerous other general-purpose or special-purpose computing system environments or configurations. Examples of computing systems, environments, and/or configurations that may be suitable for use with data processing system 1300 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Some computing environments, e.g., cloud computing environments and/or edge computing environments using data processing system 1300 or other suitable data processing system, generally support the FPGA-as-a-Service (FaaS) model. In the FaaS model, user functions are hardware accelerated as circuit designs implemented within programmable ICs operating under control of the (host) data processing system. Other examples of cloud computing models are described in the National Institute of Standards and Technology (NIST) and, more particularly, the Information Technology Laboratory of NIST.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As used herein, the term "cloud computing" refers to a computing model that facilitates convenient, on-demand network access to a shared pool of configurable computing resources such as networks, servers, storage, applications, ICs (e.g., programmable ICs) and/or services. These computing resources may be rapidly provisioned and released with minimal management effort or service provider interaction. Cloud computing promotes availability and may be characterized by on-demand self-service, broad network access, resource pooling, rapid elasticity, and measured service.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, "data processing system" means one or more hardware systems configured to process data, each hardware system including at least one processor programmed to initiate operations and memory.

As defined herein, the term "processor" or "processor core" means at least one circuit capable of carrying out instructions contained in program code. The circuit may be an integrated circuit or embedded in an integrated circuit. An SOC, as described herein, includes a plurality of processor cores and, in some cases, may be referred to as a "processor."

As defined herein, the term "soft" in reference to a circuit means that the circuit is implemented in programmable logic or programmable circuitry. Thus, a "soft processor" means at least one circuit implemented in programmable circuitry that is capable of carrying out instructions contained in program code.

As defined herein, the term "output" means storing in physical memory elements, e.g., devices, writing to display or other peripheral output device, sending or transmitting to another system, exporting, or the like.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc., may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

What is claimed is:

1. A method of synchronizing system resources of a multi-socket data processing system, the method comprising:
providing, from a primary System-on-Chip (SOC), a trigger event to a global synchronization circuit, wherein the primary SOC is one of a plurality of SOCS, each SOC of the plurality of SOCS is disposed in a different socket, and the trigger event is provided over a first sideband channel;
in response to the trigger event, broadcasting, from the global synchronization circuit, a synchronization event to the plurality of SOCS over a second sideband channel; and in response to the synchronization event, programming a system resource of each SOC of the plurality of SOCS with a common value, wherein the programming synchronizes the system resource of each SOC of the plurality of SOCS.

2. The method of claim 1, wherein the providing, the broadcasting, and the programming are performed as part of a boot process for a multi-socket data processing system including the plurality of SOCS.

3. The method of claim 1, wherein the plurality of SOCS are identical.

4. The method of claim 1, wherein:
each SOC of the plurality of SOCS includes a plurality of processor cores; and
a selected processor core of the plurality of processor cores of a selected SOC of the plurality of SOCS provides the trigger event.

5. The method of claim 1, wherein:
the synchronization event is an interrupt;
each SOC of the plurality of SOCS includes a plurality of processor cores; and
a selected processor core of each SOC of the plurality of SOCS executes an interrupt service routine in response to the interrupt to program the system resource located in a same SOC.

6. The method of claim 5, wherein the selected processor core within each SOC of the plurality of SOCS, in executing the interrupt service routine, writes to a control register of the system resource within the same SOC.

7. The method of claim 1, wherein, within each SOC of the plurality of SOCS:
the synchronization event is received by control logic of the system resource; and
in response to the synchronization event, the control logic of the system resource resets the system resource within a same SOC.

8. A method of synchronizing system resources of a multi-socket data processing system, the method comprising:
halting, under control of a primary System-on-Chip (SOC), each of a plurality of system resources, wherein each system resource is located in a different SOC of a plurality of SOCS of a multi-SOC system, wherein the primary SOC is one of the plurality of SOCS, and wherein each SOC of the plurality of SOCS is disposed in a different socket;
writing, using the primary SOC, an updated value to the system resource of another SOC of the plurality of SOCS while halted; and
initiating operation, using the primary SOC, of the system resource in each SOC of the plurality of SOCS subsequent to the writing.

9. The method of claim 8, comprising:
subsequent to the halting and prior to the writing, reading, using the primary SOC, a value from each of the plurality of system resources;
determining, by the primary SOC, a difference between the value read from the system resource of the primary SOC and the value read from the system resource of the other SOC; and
wherein the writing includes the primary SOC writing the updated value to the other SOC, wherein the updated value depends on the difference between the value read from the system resource of the primary SOC and the value read from the system resource of the other SOC.

10. The method of claim 9, wherein the writing the updated value to the system resource of the other SOC and the initiating operation accounts for latency in the primary SOC communicating with the system resource in the other SOC.

11. The method of claim 8, wherein the plurality of SOCS are identical.

12. The method of claim 8, wherein the halting, the writing, and the initiating are part of a boot process.

13. The method of claim 8, wherein communication between the primary SOC and the other SOC is conveyed over a communication bus communicatively linking the plurality of SOCS.

14. A system for synchronizing system resources of a multi-socket data processing system, the system comprising:
a plurality of System-on-Chips (SOCS), wherein the plurality of SOCS are interconnected through a communication bus, each SOC includes a plurality of processor cores, one SOC of the plurality of SOCS is designated as a primary SOC, and each SOC of the plurality of SOCS is disposed in a different socket;
a global synchronization circuit; and
a plurality of sideband channels coupling the global synchronization circuit to each of the plurality of SOCS;
wherein the primary SOC is configured to provide a trigger event over a first sideband channel of the plurality of sideband channels, the trigger event initiating synchronization of the system resources disposed in the plurality of SOCS; and
wherein the global synchronization circuit is configured to broadcast a synchronization event to each of the plurality of SOCS over a second sideband channel of the plurality of sideband channels in response to receiving the trigger event.

15. The system of claim 14, wherein the plurality of SOCS are identical.

16. The system of claim 14, wherein the trigger event and the synchronization event are conveyed as part of a boot process.

17. The system of claim 14, wherein a selected processor core of only the primary SOC provides the trigger event.

18. The system of claim 14, wherein the synchronization event is an interrupt and, within each SOC of the plurality of SOCS:
the interrupt is received by a selected processor core of the plurality of processor cores; and
the selected processor core in each SOC, in response to the interrupt, executes an interrupt service routine to program the system resource by writing to a control register of the system resource within a same SOC.

19. The system of claim 14, wherein, within each SOC of the plurality of SOCS:
the synchronization event is received by control logic of the system resource; and
in response to the synchronization event, the control logic of the system resource resets the system resource within a same SOC.

* * * * *